June 30, 1970   J. F. LEE   3,517,401
ENVIRONMENT SURVIVAL CAPSULE
Filed May 21, 1968   8 Sheets-Sheet 1
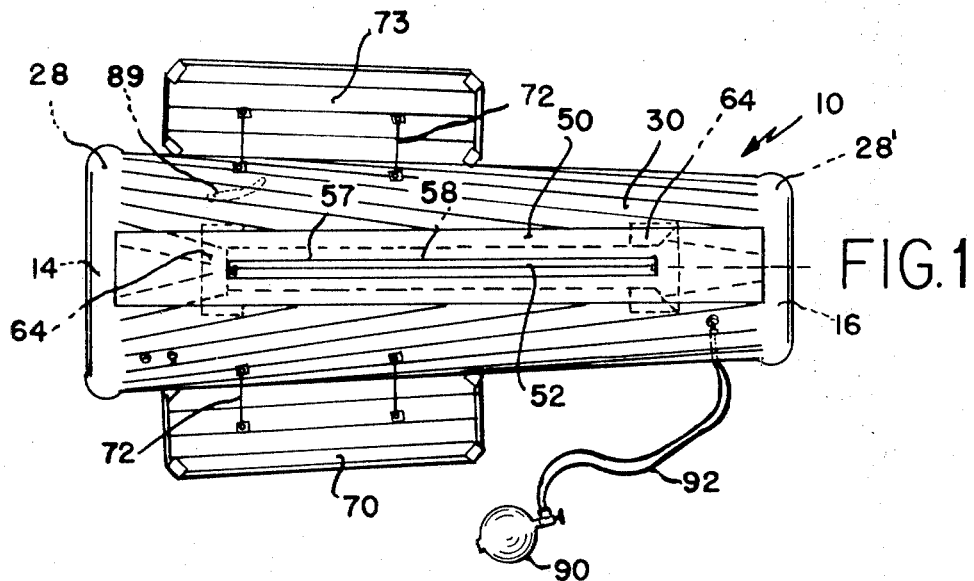
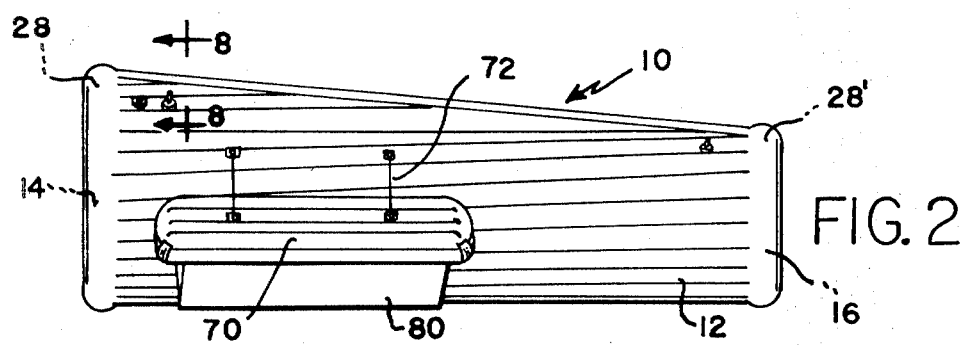
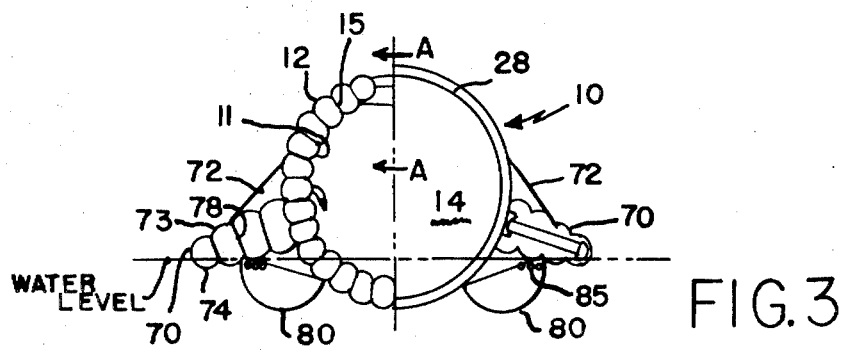
INVENTOR.
JOHN F. LEE
BY Harry A. Herbert Jr.
and
ATTORNEYS

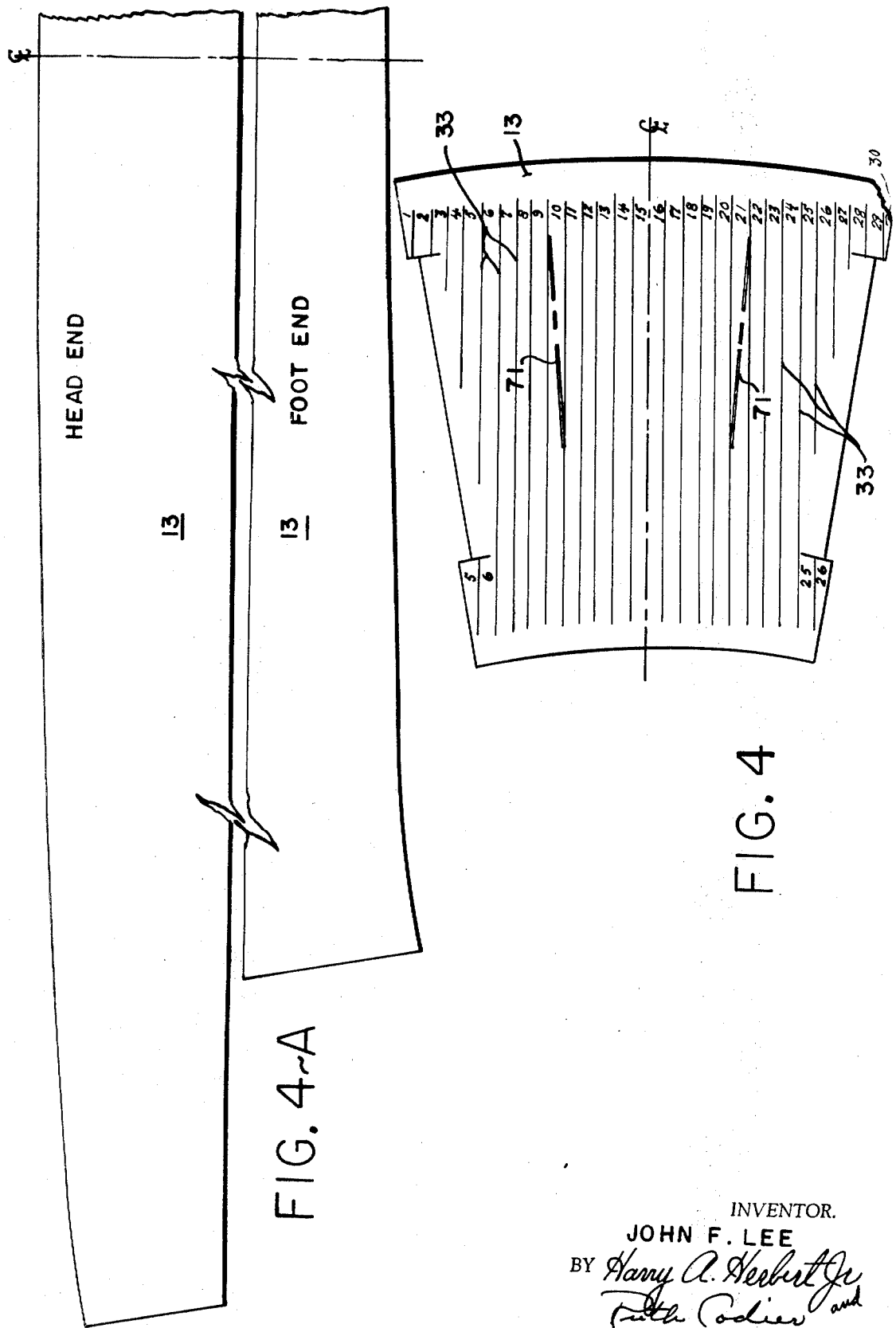

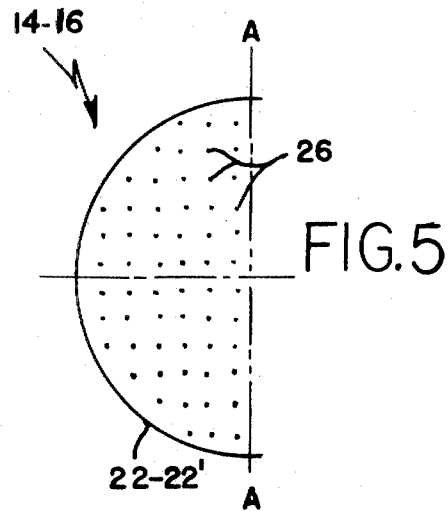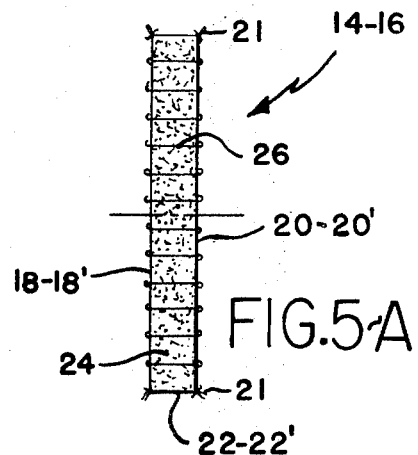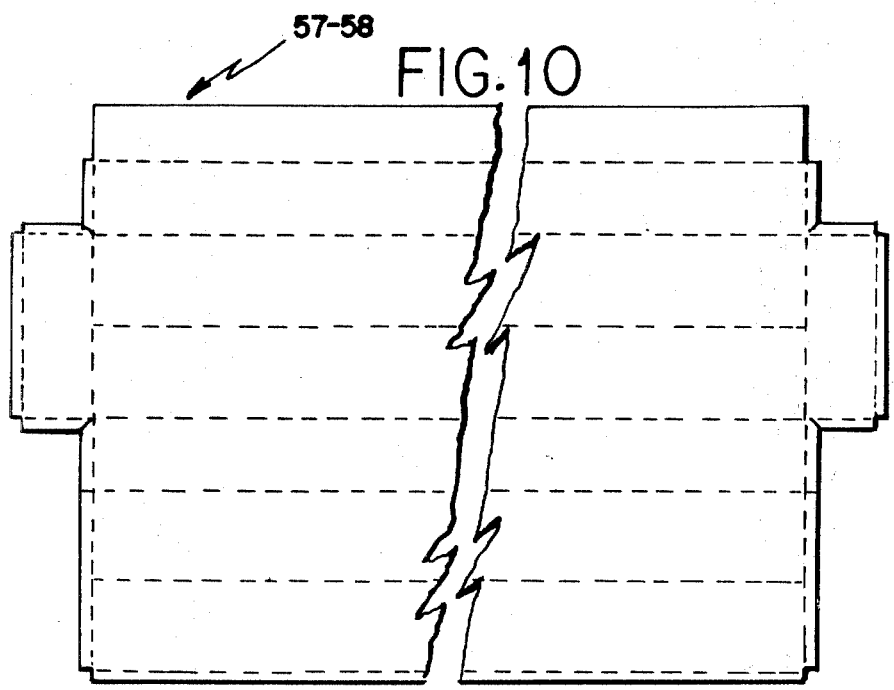

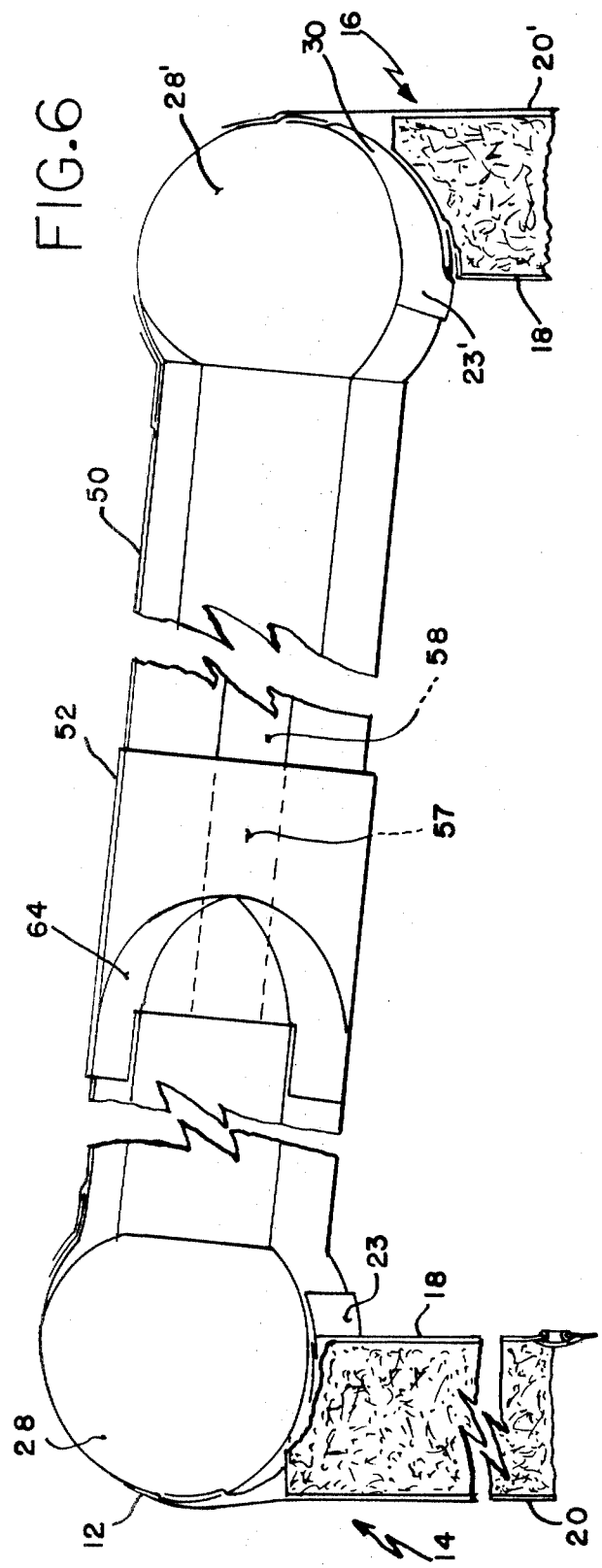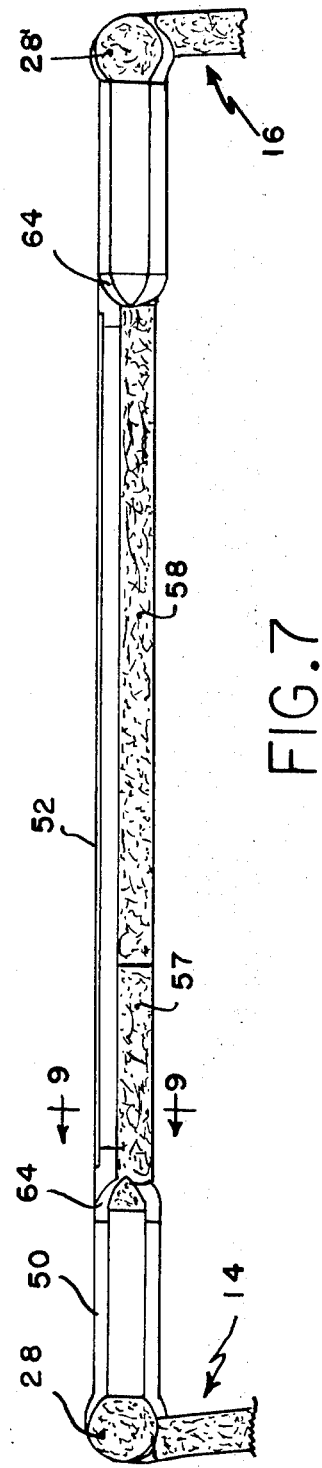

June 30, 1970 J. F. LEE 3,517,401
ENVIRONMENT SURVIVAL CAPSULE
Filed May 21, 1968 8 Sheets-Sheet 5
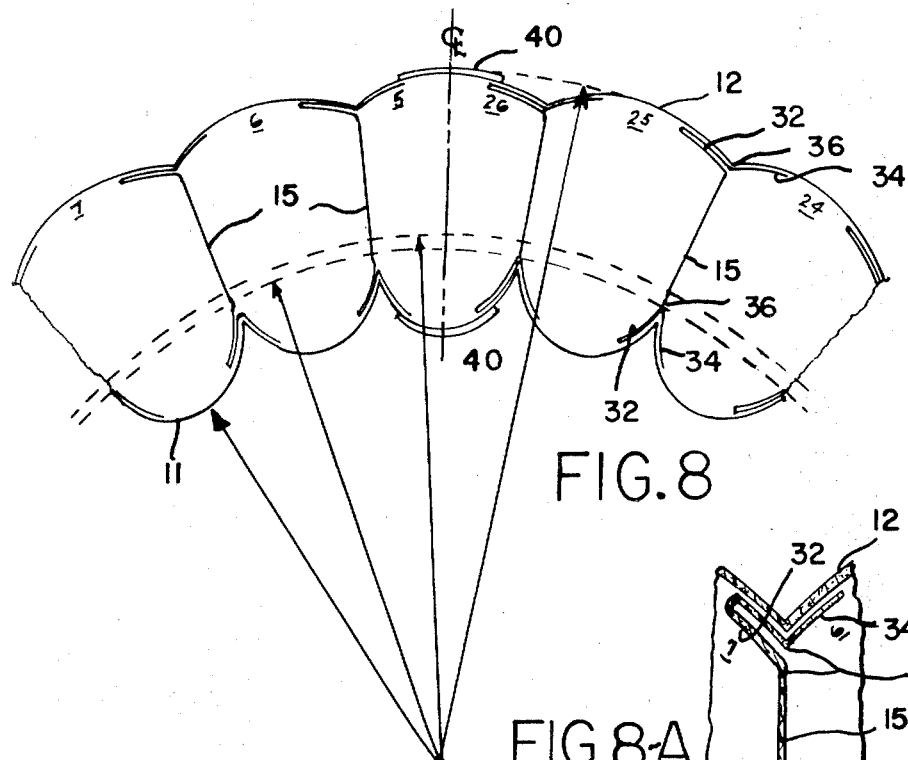
FIG. 8
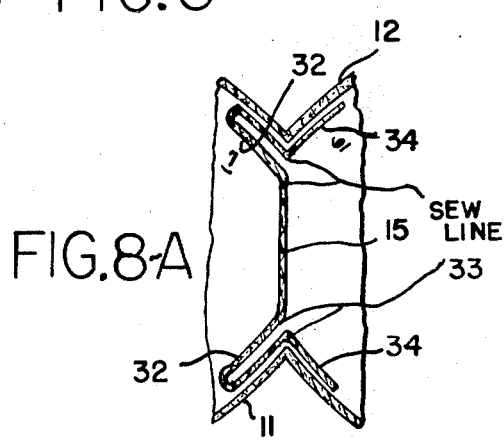
FIG. 8-A
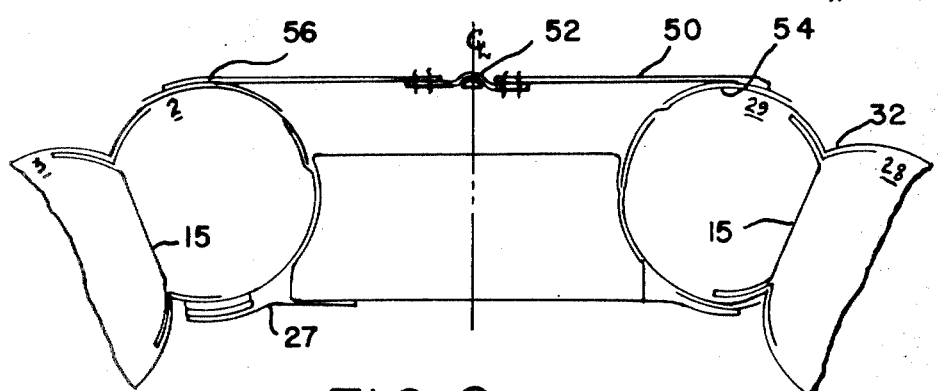
FIG. 9
INVENTOR.
JOHN F. LEE
BY Harry A. Herbert Jr
Ruth Cocier
ATTORNEYS

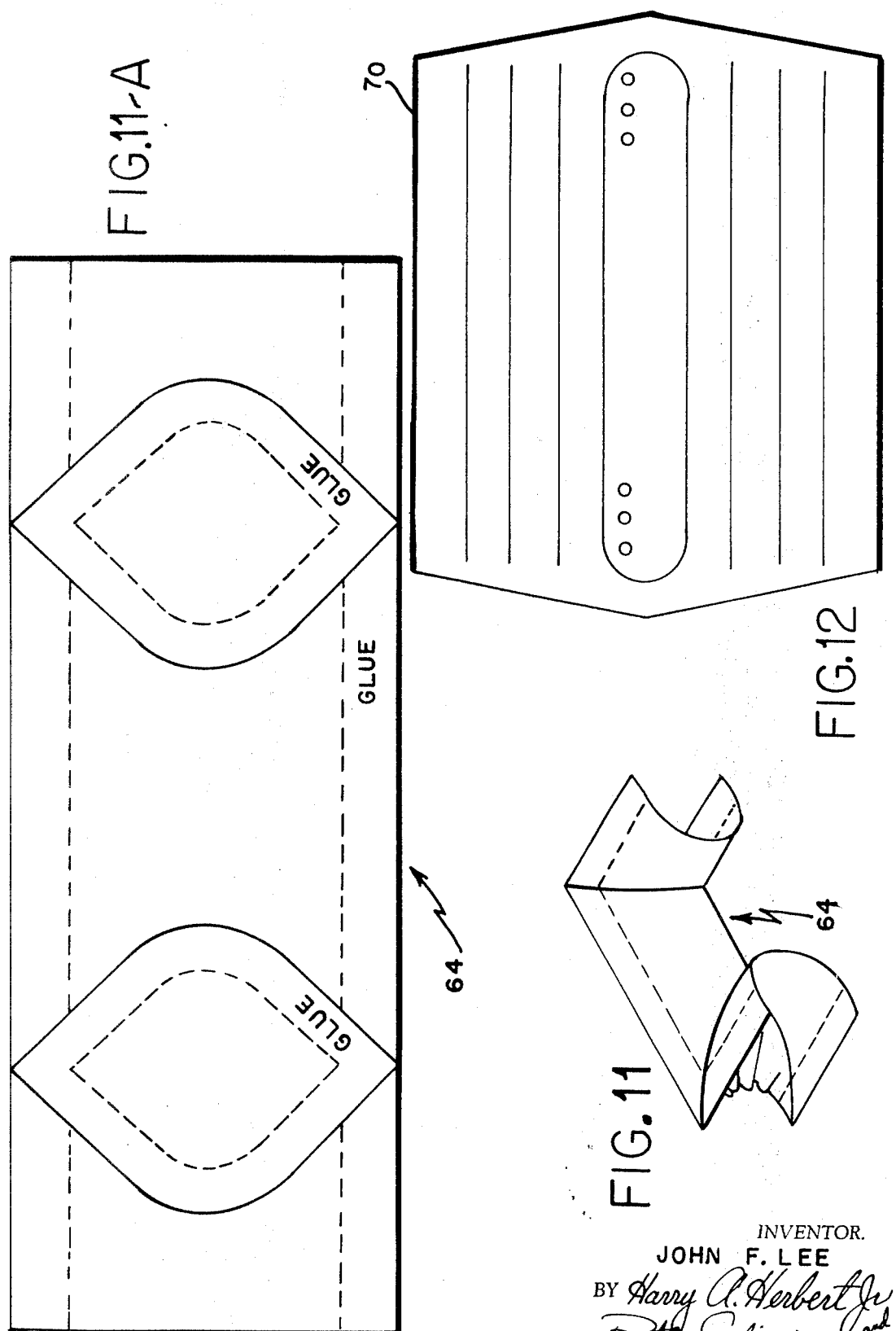

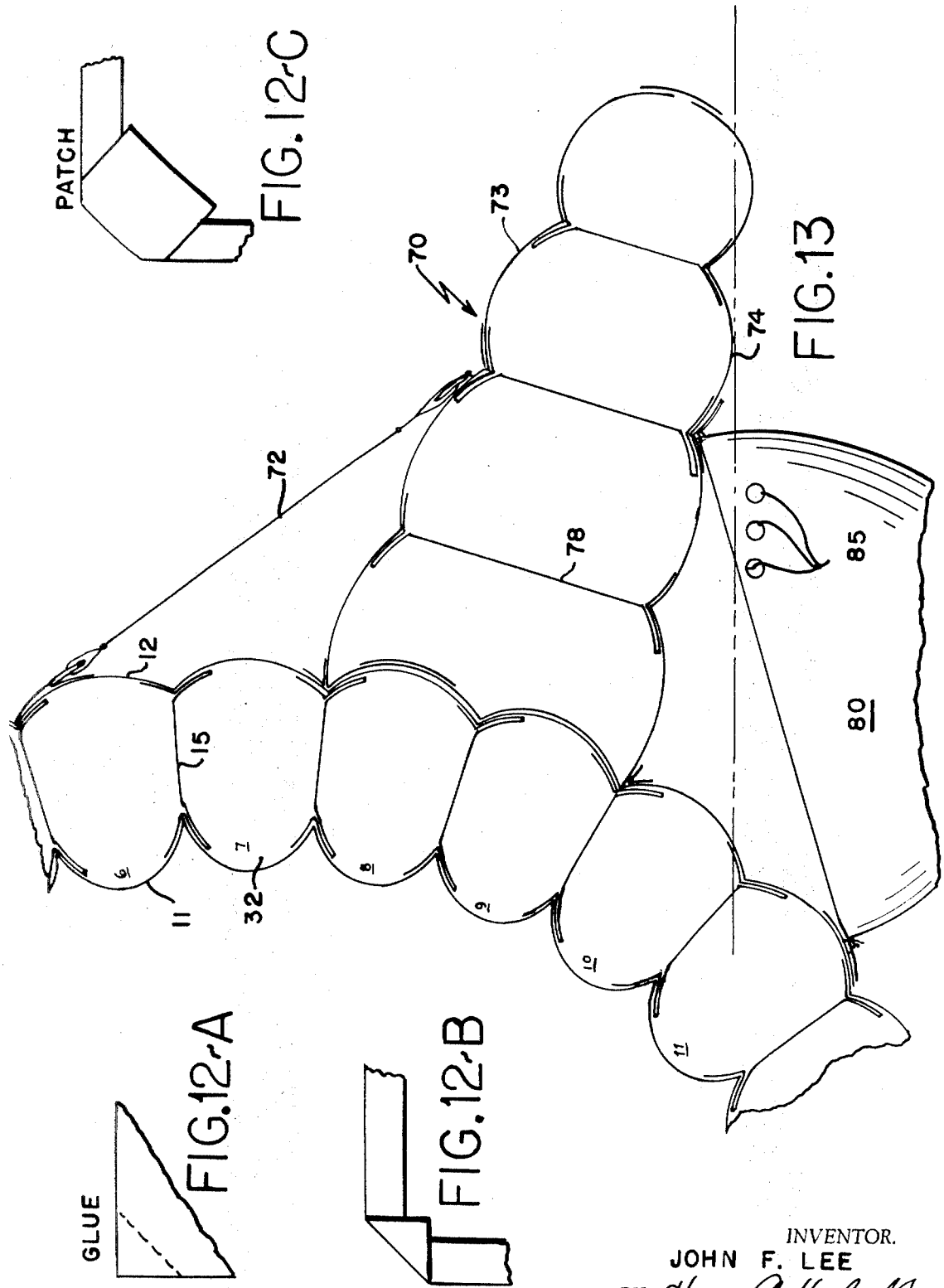

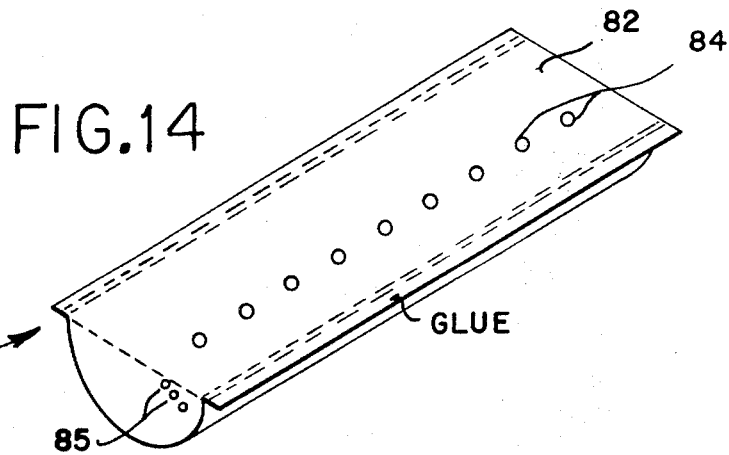
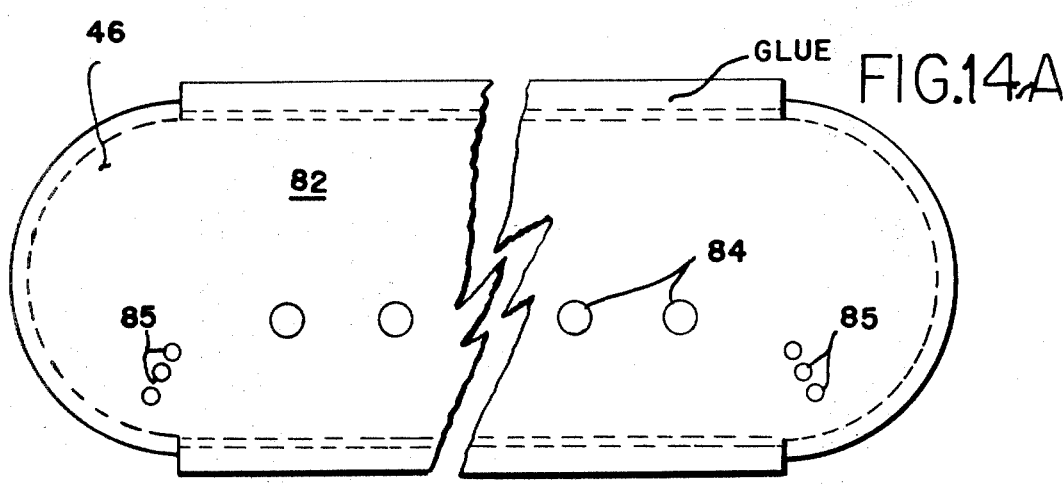
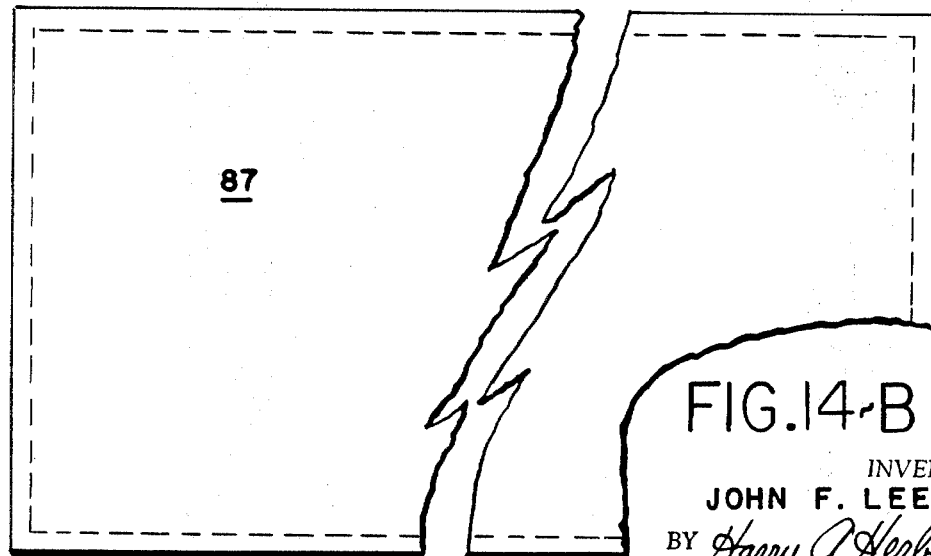

United States Patent Office 3,517,401
Patented June 30, 1970

3,517,401
ENVIRONMENT SURVIVAL CAPSULE
John F. Lee, Inglewood, Calif. (AF Unit P.O. Hq. SAMSO (SMVZP), Los Angeles, Calif. 90045)
Filed May 21, 1968, Ser. No. 730,830
Int. Cl. B63c 9/06
U.S. Cl. 9—14                                5 Claims

ABSTRACT OF THE DISCLOSURE

A double walled structure with inflatable cylindrical section and non-inflatable end walls. It is sufficiently compact to be carried on the person and be integrated with a parachute. It provides the survivor with an insulated buoyant envelope in which he can await rescue in safety. It is inflated optionally directly following parachute deployment to provide a floating dry environment capable of sustaining life for sea landings, or it can be inflated by him after ground or seat ice is reached. The structure is fabricated from nylon or similar material coated with urethane, neoprene, polyethylene or similar water-resisting and insulating materials. Compartments are provided which are filled with goose down. It is zipper-closed with ventilation provided by ventile cloth, or equivalent. A pair of fins and a pair of water ballast tanks provide buoyancy and stability. Fabric ribbing provides separation between the walls of the structure.

BACKGROUND OF THE INVENTION

This invention relates to an all environment survival capsule, and more particularly to a double walled insulated cylinder capable of sustaining a survivor on land or sea in low temperature conditions.

The necessity of improving available devices for survival in the case of air accidents is under constant research. Much work has been done in this field, and the instant invention is one successful culmination.

Aircrew members forced to escape from aircraft over cold oceans must wear oppressive rubber anti-exposure clothing while flying, and upon entering the cold ocean must be able to climb into the one-man life raft where the heavy seas encountered may throw him back into the ocean. In even moderately cold water, 50 to 60° F. survivors will become seriously hypothermic in 10 to 15 hours, and in much less time if the water is lower in temperature. Death will occur if rescue and adequate medical treatment is not provided immediately.

SUMMARY OF THE INVENTION

The object of the invention is the provision of a survival capsule which provides adequate thermal protection even in the coldest ocean for as long as the survivor may be forced to wait for rescue, and eliminates the necessity of heavy clothing during flight. The invention further provides light-weight insulation within the inflated air cells.

A further object of the invention is the provision of a survival capsule for emergency shelter, for cold land and sea survival which can be integrated with a parachute or an aircraft ejection seat. Its use may also be extended to submarines working under surface in a cold ocean. A further concept of the invention is a capsule capable of being integrated with a parachute which may be inflated around the survivor so that when he reaches the ocean he will be in an insulated protective flotation device without ever being immersed in ocean water.

This invention may be fabricated in a number of different configurations and with a variety of materials. The shape may be a cylinder or a modified cylinder, such as the example of the present disclosure, where the capsule is tapered in diameter from a maximum at the head end to a minimum at the foot end. The various cylindrical shapes or modified cylinders are all quite stable in water and stability may be enhanced by addition of fins, ballast bags or a combination of the two. Also, ventilation may be accomplished in a variety of ways, such as snorkels, diffusion panels or membranes that pass oxygen and carbon dioxide at different rates and inflation may be accomplished by a number of different means such as inflation bottles or air ejectors.

DESCRIPTION OF THE DRAWINGS

FIG. 1 is a top plan view of the device;
FIG. 2 is a side elevation;
FIG. 3 is a partial front elevational view looking at the head end, and partly in schematic cross section;
FIG. 4 is a plan view showing the pattern of the two main wall fabric sections of the device;
FIG 4A is a fragmentary view of the pattern showing the outline of head and foot sections;
FIG. 5 is a schematic half plan view of identical head and foot closing elements (identical except for diameter dimension);
FIG. 5A is a schematic cross section taken on the line A—A of FIG. 5;
FIG. 6 is a broken detailed schematic longitudinal view showing the method of attaching the head and foot members to the toroidal segments of the main wall;
FIG. 7 is a longitudinal schematic view showing the capsule opening in greater detail; (these views FIGS. 6 and 7 are taken substantially on the line A—A of FIG. 3);
FIG. 8 is a schematic cross section taken on the line 8—8 of FIG. 2;
FIG. 8A is a cross sectional view showing the manner of attachment of the rib sections to the inner and outer main wall members;
FIG. 9 is a cross sectional view through the zipper opening and taken on the line 9—9 of FIG. 7;
FIG. 10 is a schematic showing of the pattern of the box-like structure of one of the opening panels;
FIG. 10A is a cross sectional view of an opening panel;
FIG. 11 is a perspective view of the opening reinforcement;
FIG. 11A is the pattern for the reinforcement;
FIG. 12 is a fin pattern;
FIGS. 12A, 12B and 12C are details of fin corner construction;
FIG. 13 is a schematic showing of fin and ballast tank and their attachment to the capsule body;
FIG. 14 is an isometric perspective view of a ballast tank;
FIG. 14A is a pattern of the top tank segment; and
FIG. 14B is a pattern of the bottom tank segment.

DESCRIPTION OF THE PREFERRED EMBODIMENT

The capsule 10 is made almost entirely of fabric, and is double walled. The fabric material may be nylon twill, neoprene coated on one side, or it may be of any other suitable, durable waterproof material. Inner and outer main wall sections 11 and 12 are cut after the pattern shown in FIG. 4 which is designated 13. The two sections 11 and 12 are fastened together in spaced relationship by a series of ribs or separating members 15 (FIG. 3) which divide the space into longitudinally extending compartments or cells. These cells are filled with down or other insulation. Their construction will be described later in more detail.

Head and foot wall elements 14 and 16 complete a closed and tapered structure which becomes a closed environment capable of accommodating a human occupant. The head and foot elements 14 and 16 are identical in their construction except for their proportionate size. The construction of these elements is shown in FIGS. 5 and 5A and their manner of attachment to the main wall elements 11 and 12 is shown in FIG. 6.

The head and foot elements are fabricated as follows: Four circular panels 18, 18', 20 and 20' are cut from the same material as the main wall fabric. (See FIGS. 5 and 5A.) 18 and 20 are interior and exterior head panels and 18' and 20' are interior and exterior foot closure panels. The diameter of these circles in the working examples built are 19½" and 13" for head and foot, respectively. This provides a half inch for sew and glue allowance 21. Two strips 22 and 22' are cut 3¼ inches wide in lengths of 61¼ inches and 40¹³⁄₁₆ inches. Tufting threads 26 secure insulation 24 between panels 18 and 20, 18' and 20'. The strips 22 and 22' are drawn around and complete the pillow-like end structures with their attachment to elements 21. The head and foot closure elements 14 and 16 thus completed are secured into toroidal elements 28 and 28' (FIG. 6) by means of the flange attachments 23 and 23', or by any expedient means.

In the models constructed the head element 14 is filled with 72.3 grams of insulation and the foot element 16 with 53.3 g. grams of insulation, such as 100% down. Specific specifications are given for the working models built. These are given here because accurate calculations were made and are given below relative to distribution of weight, water line calculation, volume of cell ribs, volume of toroidal ends, head end and foot end, volume of wings, total inflation volume, buoyancy of the inflated capsule and other critical dimensions.

It is to be understood, however, that while the relative dimensions and weights are critical, and that these must be carefully calculated to obtain buoyancy and stability of the capsule and its occupant, the invention is not limited to the specific dimensions and materials specified here. For example, similar units may be fabricated for more than one occupant. Experience might show that variations in specifications might well be indicated. These variations may be undertaken within the scope of this invention and without departing from the spirit thereof.

The manner of cutting the separating members or rib elements 15, and their subsequent attachment to inner and outer wall elements 11 and 12 are shown in FIGS. 4, 8, 8A and 9. Approximately 60 strips of ribbing material are cut 6⁹⁄₁₆" wide. Their length is determined by reference to the numbered lines of the pattern of FIG. 4. The longest rib strips will be 73⅝" in length, and these will be attached adhesively to form compartments or segments 7 to 24. These particular compartments will be located on the underneath portion of the completed and operating device. The remaining shorter segments will be cut to lengths as indicated in the pattern. See FIG. 4 for the location of glue lines and FIGS. 4, 8 and 9 for number designations of the segments.

The width of each completed rib, that is, the width 15 which determines the distance between the inner and outer wall segments 11 and 12 at their lines of attachment is 2¹⁄₁₆".

A 2¼" fold is made along each edge of each rib and a sew line 33 completed along the length of each rib located ¾" from the rib edge. See FIG. 8A. The result is a 2¹⁄₁₆" separating rib, a double wing 32 and a single wing 34 which are secured to inner and outer main wall elements 11 and 12 by adhesive or other means. The separation of the glue lines on the pattern 13 is 2.96". The ribs 15 terminate 5½" from each end of main wall elements 11 and 12.

An opening is devised in the top of the capsule as follows: Where the segments 5 and 26 on each of walls 11 and 12 meet, they are butted and patched. See FIG. 8. Strips 40 effect a permanent closing in the head and foot areas.

Strips 50 of ventile cloth are zippered at 52 (see FIG. 9) their outer folded edges being adhesively secured to the outer main wall of segments 2 and 29 at 54 and 56. Two insulating panel members 57 and 58 (FIGS. 6 and 7) are hinged along their length and may be opened individually.

The box-like structure of insulation panels 57 and 58 are shown in FIGS. 10 and 10A. The two panels are identical except for their length and are made from main wall fabric cut as shown in FIG. 10, and filled with insulation as illustrated in FIG. 10A.

The entrance opening formed in the capsule main wall is reinforced at its ends by elements 64 shown in FIGS. 6, 7 and 11. Elements 64 are cut and glued as indicated in FIG. 11A.

A pair of fins 70 are attached to the main capsule body at lines indicated at 71 in FIG. 4. The completed and attached fin 70 is shown in FIGS. 1, 2, 3 and 13. It is attached by adhesive to the capsule wall 12 and held supported by nylon cords 72. It is canted downward at an angle of 20° to the horizontal. The fins are cut from the same material as the main wall fabric after the pattern shown in FIG. 12. Upper and lower wall elements 73 and 74 are made of main wall fabric and stuffed with insulation or otherwise rendered buoyant. Their construction is analogous to the main wall. Separating rib members 78 are cut and installed in the same fashion as the rib members 15 of the main wall.

For ballast and stabilization a pair of ballast tanks 80 constructed as shown in FIGS. 14, 14A and 14B are attached to fins 70 and main capsule wall as shown in FIGS. 2, 3 and 13.

The balance and equilibrium of the whole capsule is maintained by these tanks which are located at water level. They are made of main wall fabric cut as shown in FIGS. 14, 14A and 14B. The top element 82 is provided with two sets of drain holes 84 in the top and 85 in the ends. It is secured to the tank bottom 87 along glue lines as indicated.

The pattern as shown shows nine holes 84, equally spaced and on 3" centers, and three holes 85 in each end, placed at an angle to the water line.

The device may be inflated from the inside, orally. An oral inflation tube 89 is provided for this purpose. See FIG. 1. An inflation bottle 90 maintained under pressure and connected to the segments by means of tubing 92 may also be provided. In the example given, the inflation bottle is a Brunswick Corp. Model No. BLD-2800 with a capacity of 100 cu. in.

The following data is given relative to the weight of the bottle filled with air at 125° F. at 3000 p.s.i.

$$W = \frac{PV}{RT}$$

where:

P=Pressure, p.s.f.
V=Volume, ft.³
R=53.3 gas constant, air
T=° F. absolute
W=Weight, #

$$W = \frac{3600 \times 144\ 100}{53.3(460+125)1728} = .967\# = \text{gas weight}$$

The volume required for capsule inflation is 10.13 ft.³. The weight of gas required at −70° F. to fill this volume to 15.0 p.s.i.a. is as follows:

$$W = \frac{PV}{RT} = \frac{15 \times 144\ 10.13}{53.3(460-70)} = 1.05\#$$

The weight of air contained in the bottle is inadequate to fully inflate the capsule at −70°. There is, however, sufficient air to inflate the capsule to 15.0 p.s.i.a. at −36° F., which is lower than the average temperature of the gas in the capsule walls at steady state occupancy conditions, indicating that sufficient air is available.

Although the invention has been described with reference to a single embodiment, it will be understood to those skilled in the art that the invention is capable of a variety of alternative embodiments.

I claim:

1. A survival capsule comprising a double walled cylindrical structure capable of receiving a human being, said double wall providing space for inflation and lightweight insulation disposed also in said space, a fin attached to either side of said structure to provide additional buoyancy and a water ballast tank secured to the cylindrical structure on either side thereof and to the under portion of each of said fins and canted at an angle of the order of 20° with respect to the water level.

2. A survival capsule as claimed in claim 1 wherein said cylindrical structure is tapered from head to foot areas and comprises: a pattern, inner and outer fabric wall members cut to said pattern and secured surface to surface in spaced relationship, fabric rib strips, each of said rib strips secured along its opposite edges to inner and outer wall members along lines designated on said pattern to form separated compartments disposed longitudinally along said structure, insulation disposed in said compartments.

3. A device as claimed in claim 2 wherein the separation of said compartments terminates short of the distal ends of said inner and outer wall members, a toroidal section formed by the end areas of said wall sections, said segmented compartments communicating with the space in said toroid to allow inflation of the whole cylindrical structure by a single means.

4. In a device as claimed in claim 3, non-inflatable circular head and foot sections fitted into said toroidal segments, each of said sections comprised of an inner circular panel and an outer circular panel, insulation material positioned between and spacing said outer panel and said inner panel, and tufting at regular and spaced intervals and securing together said inner and said outer panel and said interposed tufting.

5. A device as claimed in claim 3, wherein said fin members are fabricated in the same compartmented manner as the segmented compartments of said main wall structure.

References Cited

UNITED STATES PATENTS

| | | | |
|---|---|---|---|
| 2,363,249 | 11/1944 | Hutchinson | 9—11 |
| 2,764,766 | 10/1956 | Boyle et al. | 9—11 |
| 3,060,465 | 10/1962 | Carstensen | 9—14 |
| 3,155,992 | 11/1964 | Shewmake et al. | 9—11 |
| 3,428,978 | 2/1969 | Johnson | 9—11 |

MILTON BUCHLER, Primary Examiner

J. L. FORMAN, Assistant Examiner

U.S. Cl. X.R.

9—11